Patented Dec. 18, 1945

2,391,164

UNITED STATES PATENT OFFICE 2,391,164

METALLIZABLE TRIAZINE AZO DYESTUFFS

Otto Kaiser, Basel, Switzerland, assignor to the firm of Society of Chemical Industry in Basle, Basel, Switzerland No Drawing. Application June 23, 1941, Serial No. 399,413. In Switzerland July 9, 1940

7 Claims. (Cl. 260—153)

In the U. S. Patents No. 2,154,981 and 2,167,804 there are described inter alia green dyestuffs which have been obtained by uniting a blue element of the anthraquinone series, e. g., 1-amino-4-(4'-aminophenyl)-aminoanthraquinone-2-sulfonic acid with yellow aminoazo dyestuffs, for instance, with the aminoazo dyestuff which is formed by saponification of the product obtained by coupling diazotized acetyl-p-phenylenediamine and salicylic acid. The combination of the two dyestuff components occurs advantageously by means of halides of polyvalent organic acids, or analogues of such compounds, that is to say, compounds having halogen atoms capable of reacting, such as phosgene, the dichloride of terephthalic acid, cyanuric chloride, cyanuric bromide, dichlorophenyltriazine, dichloroquinazoline, tribromopyrimidine, and the like.

These dyestuffs, if they contain the salicylic acid grouping, are capable of forming complex copper salts. If the formation of the copper complexes is carried out on the fiber, for example, by aftertreatment of the dyeings with copper compounds, the wet fastness of such dyeings is increased, but not in a sufficient manner.

It has now been found that new dyestuffs can be obtained if at least one benzoylamino group be inserted between the yellow or blue components of the dyestuffs of the patents mentioned in the first paragraph and the connecting link or atomic grouping which effects the union of these two elements. These new dyestuffs differ from the green dyestuffs of the above mentioned patents (which contain the atom grouping of salicylic acid in their yellow element) insofar as they yield dyeings, the wet fastness of which can be improved by aftertreatment with copper compounds to such an extent that quite generally they satisfy present day requirements. This result is wholly surprising because it could not be anticipated that such a relatively small alteration of the constitution would be coupled with such an effect, particularly when the number of the positions in the dyestuff molecule capable of coupling with copper is not increased.

The new dyestuffs therefore correspond with the general formula

A—z—x—z—R₁—N=N—R₂ wherein the various symbols A, z, x, R₁—N=N—R₂ have the following signification:
A=the radical of a blue aminoanthraquinone dyestuff; one z=a connecting link selected from the group consisting of

(one of the y's standing for an

group which is linked with the connecting member x, and the other y for a hydrogen atom); the other z=an

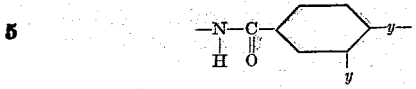

group (the two y's also having the meaning given above); x=a connecting link selected from the group consisting of

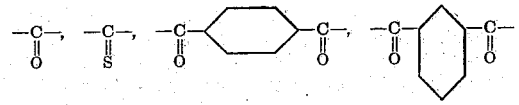

and the radical of a heterocyclic six-membered system, whose heterocyclic six-membered ring consists of carbon and nitrogen atoms of which at least 3 and not more than 4 are carbon atoms, and at least 2 and not more than 3 are nitrogen atoms, not more than 2 nitrogen atoms being linked with each other, which heterocyclic six-membered ring contains at least twice and not more than three times the atom grouping

R₁—N=N—R₂=radical of a yellow azo dyestuff wherein R₁ stands for an aromatic ring of the benzene series, in which ring the

group of the symbol z and the azo group stand in a position to each other which is different from the o-position, and wherein R₂ stands for a radical which causes the yellow color of the atom grouping R₁—N=N—R₂ and is characterized by a benzene ring in which an OH— and a COOH— group stand in o-position to each other.

Particularly valuable are the dyestuffs in which the radical A stands for the radical of a blue aminoaryl-aminoanthraquinone dyestuff. In this case the new dyestuffs correspond to the general formula A—N—R₃—z—x—z—R₁—N=N—R₂
|
H wherein z, x and R₁—N=N—R₂ have the meanings already mentioned, and wherein

then stands for the aminoanthraquinone radical of a blue aminoanthraquinone dyestuff, and

stands for the radical of a mono- or binuclear aromatic amine.

Of particular value are the dyestuffs in which the symbol

stands for the radical of a 1:4-diamino-anthraquinone-2-sulfonic acid, and in which the other symbols $R_3$, $z$, $x$ and $R_1$—N=N—$R_2$ have the meanings indicated above.

In such dyestuffs $R_3$ may, for instance, correspond to the following aromatic mono- to binuclear diamines: 1:4-diaminobenzene, 1:3-diaminobenzene, 1:4-diaminobenzene-3-sulfonic acid, 1:3-diaminobenzene-4-sulfonic acid, 4:4'-diaminodiphenyl, 4:4'-diamino-3:3'-dimethyl- or -dimethoxydiphenyl, 4:4'-diaminodiphenyl-3-sulfonic acid, 4:4'-diaminostilbene, 4:4'-diaminodiphenylmethane, 4:4'-diaminodiphenylurea, 4:4'-diaminobenzoylaniline, 3:3'-diaminobenzoylaniline, 4:3'-diaminobenzoylaniline, 4:4'-diaminodiphenylurea-3-sulfonic acid, 4:4'-diaminodiphenyl-2-sulfonic acid.

Further the atom grouping $R_1$—N=N—$R_2$ may be derived from the following aminoazo dyestuffs: 4-amino-4'-hydroxy-1:1'-azobenzene-3'-carboxylic acid, 3-amino-4'-hydroxy-1:1'-azobenzene-3'-carboxylic acid, 4-amino-4'-hydroxy-1:1'-azobenzene-3-sulfo-3'-carboxylic acid, 4-amino-4'-hydroxy-1:1'-azobenzene-5'-sulfo-3'-carboxylic acid, 4-amino-2-methyl-4'-hydroxy-1:1'-azobenzene-3'-carboxylic acid, 4-amino-2-methyl-4'-hydroxy-1:1'-azobenzene-5'-sulfo-3'-carboxylic acid, 4-amino-3-methyl-4'-hydroxy-1:1'-azobenzene-5'-sulfo-3'-carboxylic acid, 4-amino-3-methoxy-6-methyl-4'-hydroxy-1:1'-azobenzene-5'-sulfo-3'-carboxylic acid. It may also be derived from somewhat more complicated aminoazo dyestuffs, such as, for example, the saponification product of the azo dyestuff from diazotized 4-acetylamino- or 3-acetylamino-1-aminobenzene and 1-(4'-hydroxy-3'-carboxy)-phenyl-3-methyl-5-pyrazolone, etc.

The atom groupings

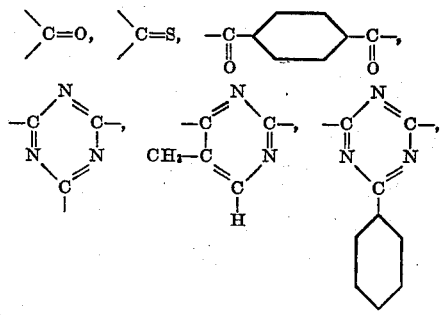

which among others, correspond to the connecting member $x$, as hereinbefore set forth are thus derived from compounds, such as phosgene, thiophosgene, terephthalic acid or terephthalic acid dichloride, isophthalic acid or isophthalic acid dichloride, cyanuric chloride, or cyanuric bromide of the formula

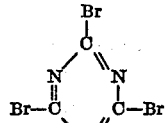

tribromomethylpyrimidine of the formula

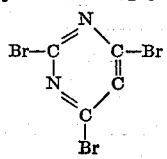

dichloroquinazoline of the formula

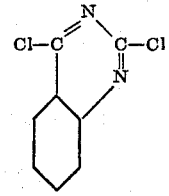

dichlorophthalazine of the formula

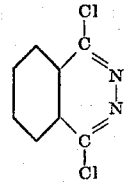

(etc.)

Of particular importance, however, are the connecting links which are derived from triazine derivatives, both on account of the good properties of the final dyestuffs obtained therefrom, and also because of the easy accessibility of such products and their good reactability.

Among the blue aminoanthraquinone dyestuffs there come into consideration inter alia polyaminoanthraquinones, such as, for example, 1:4:5:8-tetraaminoanthraquinone, 1:4:5-triamino-8-hydroxyanthraquinone or 1:5-diamino-4:8-dihydroxyanthraquinone, further 1-amino-4-aminoarylidoanthraquinones, particularly the sulfonic acids of such products. Of particular value for the production of the dyestuffs here under consideration are the 1-amino-4-aminoarylidoanthraquinones of the general formula

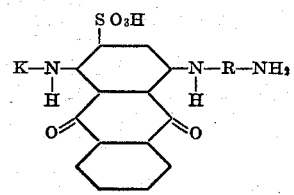

wherein

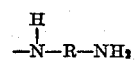

stands for the radical of a mono- to binuclear aromatic diamine, and K for an alkyl radical or for a hydrogen atom.

From the above statements it follows, therefore, that among the dyestuffs of the present application those are of especial interest which in their free state correspond to the general formula

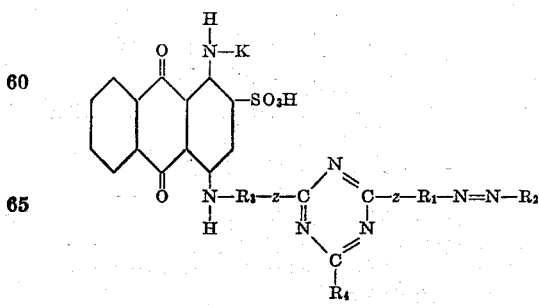

wherein K, $R_3$, $z$ and $R_1$—N=N—$R_2$ have the already indicated signification, and $R_4$ stands for a monovalent substituent which may, for instance, consist of a halogen atom, an OH— group, an $NH_2$— group, an alkyl group, or an aryl radical. But particularly valuable are the dyestuffs wherein $R_4$ corresponds to the radical of a primary or secondary amine, that is to say, to the symbol

wherein $v$ stands for a hydrogen atom or an alkyl radical, and $t$ for an alkyl radical or an aryl radical;

may, for instance, correspond to the radicals of the following amines: mono-methylamine, mono-ethylamine, diethylamine, n-mono-butylamine, aniline, p-toluidine, p-aminosalicylic acid, β-naphthylamine, 1 - naphthylamino - 6 - sulfonic acid, 4-amino-4'-hydroxy-1:1'-azobenzene-3'-carboxylic acid, 4'-amino-4-benzoylamino-1-hydroxybenzene-2-carboxylic acid, etc.

The following examples illustrate the invention, the parts being by weight:

*Example 1*

48.9 parts of 1-amino-4-(4'-amino-3'-sulfo)-anilido-anthraquinone-2-sulfonic acid are dissolved as disodium salt in 500 parts of water with addition of 8.4 parts of sodium bicarbonate. This solution is treated at about 60° C. with 18.5 parts of 4-nitrobenzoylchloride which have been mixed with 10 parts of acetone. The nitrobenzoyl product formed is reduced to the corresponding aminobenzoyl products at 60-70° C. with 42 parts of crystallized sodium sulfide, dissolved in 100 parts of water. 60.8 parts of the separated reduction product—which may be designated as 1-amino - 4-[4'-(4''-aminobenzoyl) - amino - 3'-sulfo] - anilidoanthraquinone - 2 - sulfonic acid—are added as a neutral solution in 1000 parts of water to a suspension of 18.5 parts of cyanuric chloride in 500 parts of cold water. The temperature is kept at 10 to 15° C. for one hour. The hydrochloric acid formed during the condensation is neutralized by a corresponding quantity of sodium carbonate. 25.7 parts of 4-amino-4'-hydroxy-1:1'-azobenzene-3'-carboxylic acid dissolved in 500 parts of warm water are then added to the mono-condensation product. The temperature is thereby raised to 40° C. After two hours 18 parts of aniline are added and the temperature kept at 80° C. for an equal period, when the formation of the tertiary condensation product is complete. It is separated with sodium chloride and dried. The product corresponding in the free state to the probable formula

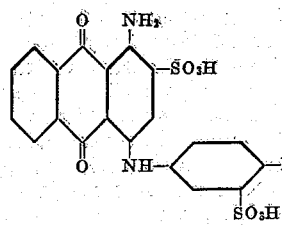

dyes cotton from a weakly alkaline bath in the presence of copper sulfate and tartrate of sodium green tints which are fast to washing and to light.

If the aniline used in the above example be replaced by a second 25.7 parts of 4-amino-4'-hydroxy-1:1'-azobenzene-3'-carboxylic acid, a product is obtained which dyes cotton in yellowish green tints. The product, in the free state, corresponds to the probable formula

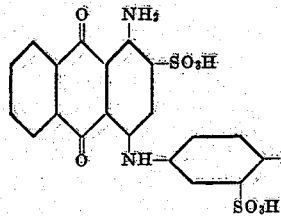

If 50 parts of the monoazo dyestuff obtained by uniting molecular proportions of diazotized 1-amino-4-hydroxy-3-carboxybenzene - 5 - sulfonic acid and 1-methyl-3-amino-4-methoxybenzene, followed by treatment of the formed monoazo dyestuff with 4-nitrobenzoylchloride and subsequent reduction, be used instead of 25.7 parts of 4-amino-4'-hydroxy - 1:1' - azobenzene-3'-carboxylic acid in the production of the dyestuff of the first paragraph of this Example, there is obtained a product which dyes cotton yellowish green tints having the same fastness properties. This dyestuff, in the free state, very probably corresponds to the formula

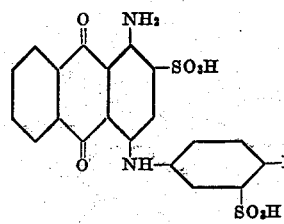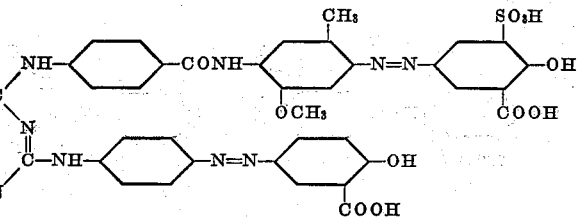

Example 2

25.7 parts of 4-amino-4'-hydroxy-1:1'-azobenzene-3'-carboxylic acid are dissolved as sodium salt in 250 parts of water with addition of 8.4 parts of sodium bicarbonate. This solution is treated at about 60° C. with 18.5 parts of 3-nitrobenzoylchloride which have been mixed with 10 parts of acetone and kept at the temperature of 80° C. for one hour. The nitrobenzoyl product is reduced at 60° C. with 42 parts of crystallized sodium sulfide, dissolved in 100 parts of water, to the corresponding aminobenzoyl product.

37.6 parts of the separated reduction product are added as a neutral solution in 1000 parts of water to a suspension of 18.5 parts of cyanuric chloride in 500 parts of cold water. The temperature is kept at 5 to 10° C. for two hours. The hydrochloric acid formed during the condensation is neutralized by a corresponding quantity of sodium carbonate. A neutral solution of 48.9 parts of 1-amino-4-(4'-amino-3'-sulfo)-anilido-anthraquinone-2-sulfonic acid in 1000 parts of water is then added to the mono-condensation product and the temperature is raised to 40° C. This temperature is maintained for 20 hours, and the hydrochloric acid which has been liberated is neutralized little by little with the corresponding quantity of sodium carbonate. 18 parts of aniline are then added and the temperature is kept at 80–85° C. for 3 hours. The whole is made distinctly alkaline with sodium carbonate; the tri-condensation product formed is separated with sodium chloride and dried.

The product in the free state corresponds very probably to the formula

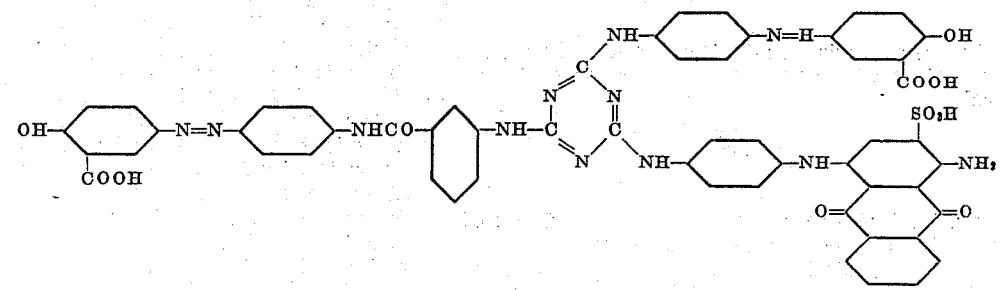

and dyes cotton from a weakly alkaline bath in the presence of copper sulfate and tartrate of sodium green tints which are fast to washing and to light.

If in the above example use is made of a second 25.7 parts of 4-amino-4'-hydroxy-1:1'-azobenzene-3'-carboxylic acid instead of aniline, there is obtained a dyestuff which dyes cotton in yellowish green tints having the same fastness properties. It corresponds in the free state to the probable formula

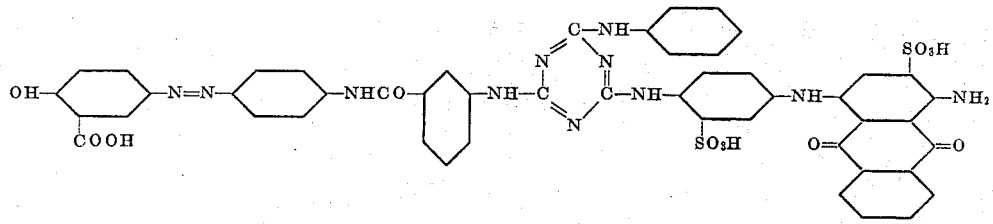

Example 3

27.1 parts of 4-amino-3-methyl-4'-hydroxy-1:1'-azobenzene-3'-carboxylic acid are dissolved as sodium salt in 250 parts of water with addition of 8.4 parts of sodium bicarbonate. This solution is treated at 60° C. with 18.5 parts of 4-nitro-benzoylchloride which have been mixed with 10 parts of acetone and is kept at 80° C. for one hour. The nitrobenzoyl product is reduced at 60° C. with 42 parts of crystallized sodium sulfide, dissolved in 1000 parts of water, to the corresponding aminobenzoyl product.

39 parts of the separated reduction product are added as a neutral solution in 1000 parts of water to a suspension of 18.5 parts of cyanuric chloride in 500 parts of cold water. The temperature is kept at 5–10° C. for two hours. The hydrochloric acid formed during the condensation is neutralized by a corresponding quantity of sodium carbonate. A neutral solution of 60.8 parts of 1-amino - 4-[4'-(4''-aminobenzoyl) - amino-3'-sulfo]-anilidoanthraquinone-2-sulfonic acid—cf. Example 1—in 1000 parts of water is then added to the mono-condensation product and the temperature is raised to 40° C. This temperature is maintained for 20 hours and the hydrochloric acid which has been liberated is neutralized little by little with the corresponding quantity of sodium carbonate. Then, 15.3 parts of 4-aminosalicylic acid are added and the temperature is kept at 80–85° C. for three hours. The whole is made distinctly alkaline with sodium carbonate, the tri-condensation product is separated with sodium chloride and dried.

The product, corresponding in the free state to the probable formula

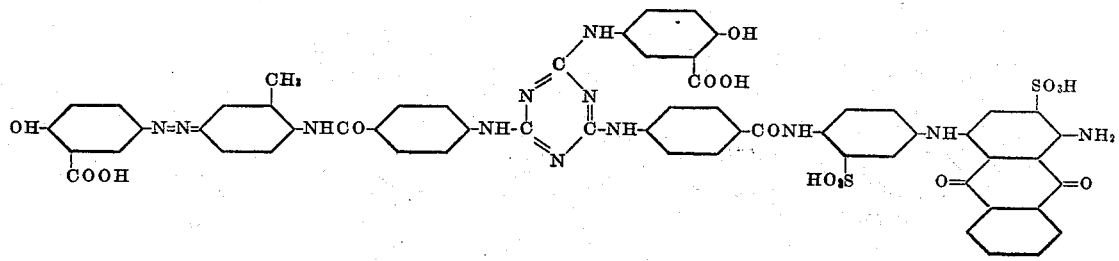

dyes cotton from a weakly alkaline bath in the presence of copper sulfate and tartrate of sodium green tints which are fast to washing and to light.

Example 4

60.8 parts of 1-amino-4-[4'-(4''-aminobenzoyl)-amino-3'-sulfo]-anilidoanthraquinone-2-sulfonic acid—cf. Example 1— and 39 parts of 4-(4'-aminobenzoyl)-amino-3-methyl-4'-hydroxy-1:1'-azobenzene-3'-carboxylic acid are mixed up by stirring in 4000 parts of water, 100 parts of sodium carbonate are added and the whole is treated with phosgene at a temperature of 35° C. for 20 hours. As soon as no free amino group can be detected after this time the condensation product formed is filtered, if necessary, after addition of sodium chloride. It is dissolved in water as sodium salt and precipitated with sodium chloride and dried.

The product, corresponding in the free state to the probable formula

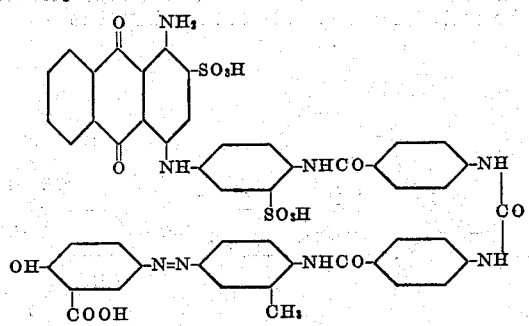

dyes cotton from a weakly alkaline bath in the presence of copper sulfate and tartrate of sodium green tints which are fast to washing and to light.

When proceeding in an analogous manner with the other combinations, mentioned in the remaining examples, similar dyestuffs are obtained.

Example 5

25.7 parts of 4-amino-4'-hydroxy-1:1'-azobenzene-3'-carboxylic acid are dissolved as sodium salt in 250 parts of water with addition of 8.4 parts of sodium bicarbonate. This solution is treated at about 60° C. with 18.5 parts of 3-nitrobenzoylchloride which have been mixed with 10 parts of acetone and kept at the temperature of 80° C. for one hour. The nitrobenzoyl product is reduced at 60° C. with 42 parts of crystallized sodium sulfide, dissolved in 100 parts of water, to the corresponding aminobenzoyl product.

37.6 parts of the separated reduction product are added as a neutral solution in 1000 parts of water to a suspension of 18.5 parts of cyanuric chloride in 500 parts of cold water. The temperature is kept at 5-10° C. for two hours. The hydrochloric acid formed during the condensation is neutralized by a corresponding quantity of sodium carbonate. A neutral solution of 43 parts of 1.5-dioxy-4.8-diaminoanthraquinone-2.6-disulfonic acid dissolved in 1000 parts of water is then added to the mono-condensation product. The temperature is raised to 40° C. This temperature is maintained for 2 hours and the hydrochloric acid which has been liberated is neutralized little by little with the corresponding quantity of sodium carbonate. 18 parts of aniline are then added and the temperature is kept at 90° C. for three hours. The whole is made distinctly alkaline with sodium carbonate; the tri-condensation product formed is separated with sodium chloride and dried.

The product dyes cotton from a weakly alkaline bath in the presence of copper sulfate and tartrate of sodium green tints which are fast to washing and to light. It corresponds in the free state to the probable formula

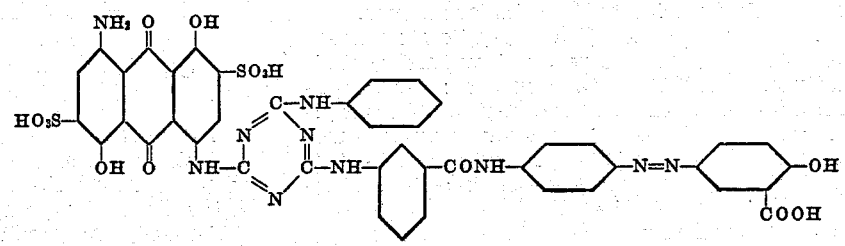

Example 6

48.9 parts of 1-amino-4-(4'-amino-3'-sulfo)-anilidoanthraquinone-2-sulfonic acid are dissolved as disodium salt in 500 parts of water with addition of 8.4 parts of sodium bicarbonate. This solution is treated at about 60° C. with 18.5 parts of 4-nitro-benzoylchloride which have been mixed with 10 parts of acetone. The nitrobenzoyl product formed is reduced at 60-70° C. with 42 parts of crystallized sodium sulfide, dissolved in 100 parts of water, to the corresponding aminobenzoyl product.

60.8 parts of the separated reduction product are dissolved as sodium salt in 1000 parts of water, a solution of 16.3 parts of 4-methyl-2.6-dichloropyrimidine in 400 parts of acetone is added and the mixture is heated at 50-60° C. for 4 hours with thorough stirring in a vessel connected with a descending condenser. The hydrochloric acid formed during the condensation is neutralized by a corresponding quantity of sodium carbonate. A neutral solution of 25.7 parts of 4-amino-4'-hydroxy-1:1'-azobenzene-3'-carboxylic acid in 1000 parts of water is then added to the mono-condensation product and the temperature is raised to 90-95° C. This temperature is maintained for 4 hours, and the hydrochloric acid which has been liberated is neutralized little by little with the corresponding quantity of sodium carbonate. The whole is made distinctly alkaline with sodium carbonate; the di-condensation product formed is separated with sodium chloride and dried.

The product dyes cotton from a weakly alkaline bath in the presence of copper sulfate and tartrate of sodium green tints which are fast to washing and to light. It corresponds very probably to the formula

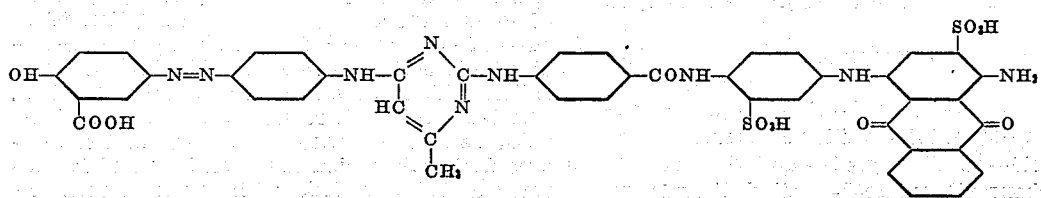

If the blue component in the above examples is replaced by other components, for example, by the condensation products which are formed from 1 molecular proportion of 1-amino-4-bromo-anthraquinone -2-sulfonic acid and 1 molecular proportion of p- or m-phenylene-diamine, 1 mol m-phenylenediaminesulfonic acid, 1 mol 4:4'-diaminodiphenyl, 1 mol 4:4'-diaminodiphenyl-3-sulfonic acid, 1 mol 4:4'-diaminostilbene, 1 mol 4:4'-diaminodiphenylmethane, 1 mol 4:4'-diamino-diphenylurea-3'-sulfonic acid etc., work is carried out in a similar manner.

In the above examples the yellow aminoazo dyestuffs may also be replaced by further similarly constituted dyestuffs such as: 4-amino-2-methyl-4'-hydroxy-1:1'-azobenzene-3'-carboxylic acid, 4-amino-2-methyl-4'-hydroxy-1:1'-azobenzene - 5' - sulfo - 3' - carboxylic acid, 4 - (4''-aminobenzoyl) - amino - 2 - methyl-4'-hydroxy-1:1' - azobenzene - 5' - sulfo - 3' - carboxylic acid, 4 - (3'' - aminobenzoyl) - amino - 2 - methyl - 4'-hydroxy-1:1'-azobenzene-5' - sulfo-3'-carboxylic acid, 4 - amino -2.5'- dimethyl -4'- hydroxy-1:1'-azobenzene-3'-carboxylic acid.

There come also into consideration products such as the azo dyestuff which is obtained by uniting diazotized p-aminosalicylic acid with pyrazolones of the formula

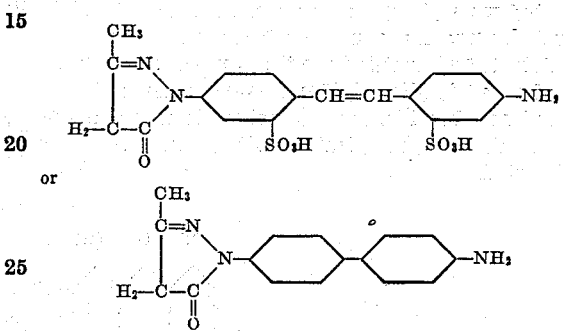

and derivatives thereof which are obtained by acylating the amino group with compounds such as p- or m-nitrobenzoylchloride and reduction of the nitro group to an amino group.

Naturally, in producing dyestuffs containing further components, slight alterations must be made in the procedure according to the properties of the intermediate products employed. These alterations are obvious to anyone skilled in the art. Such dyestuffs are for instance

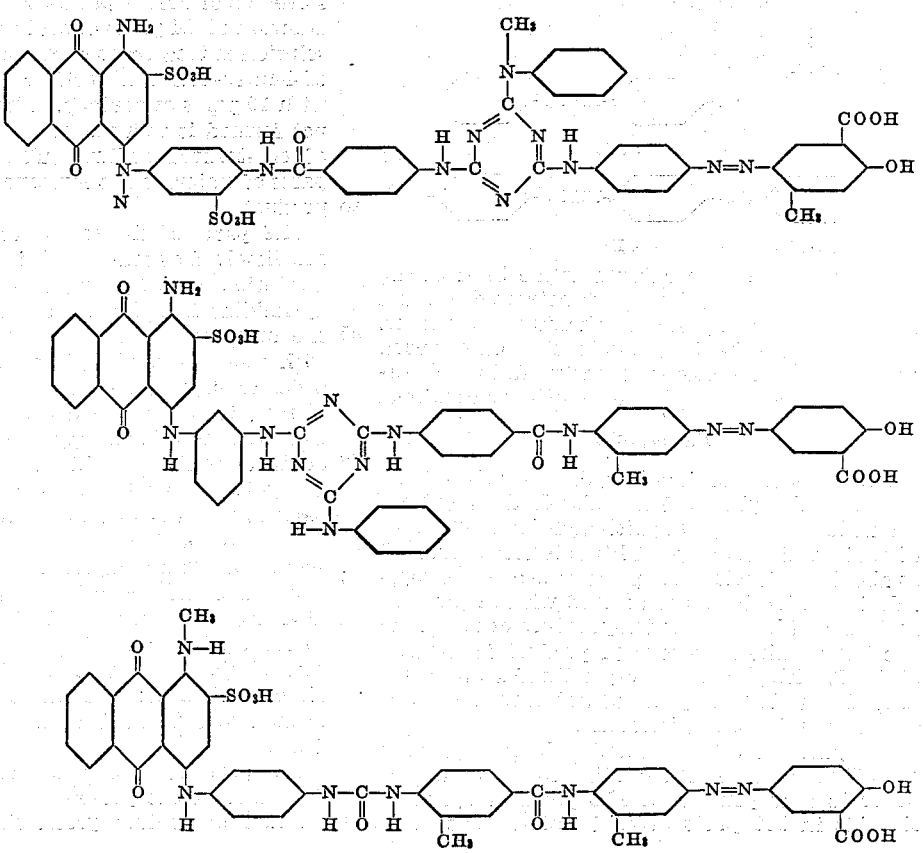

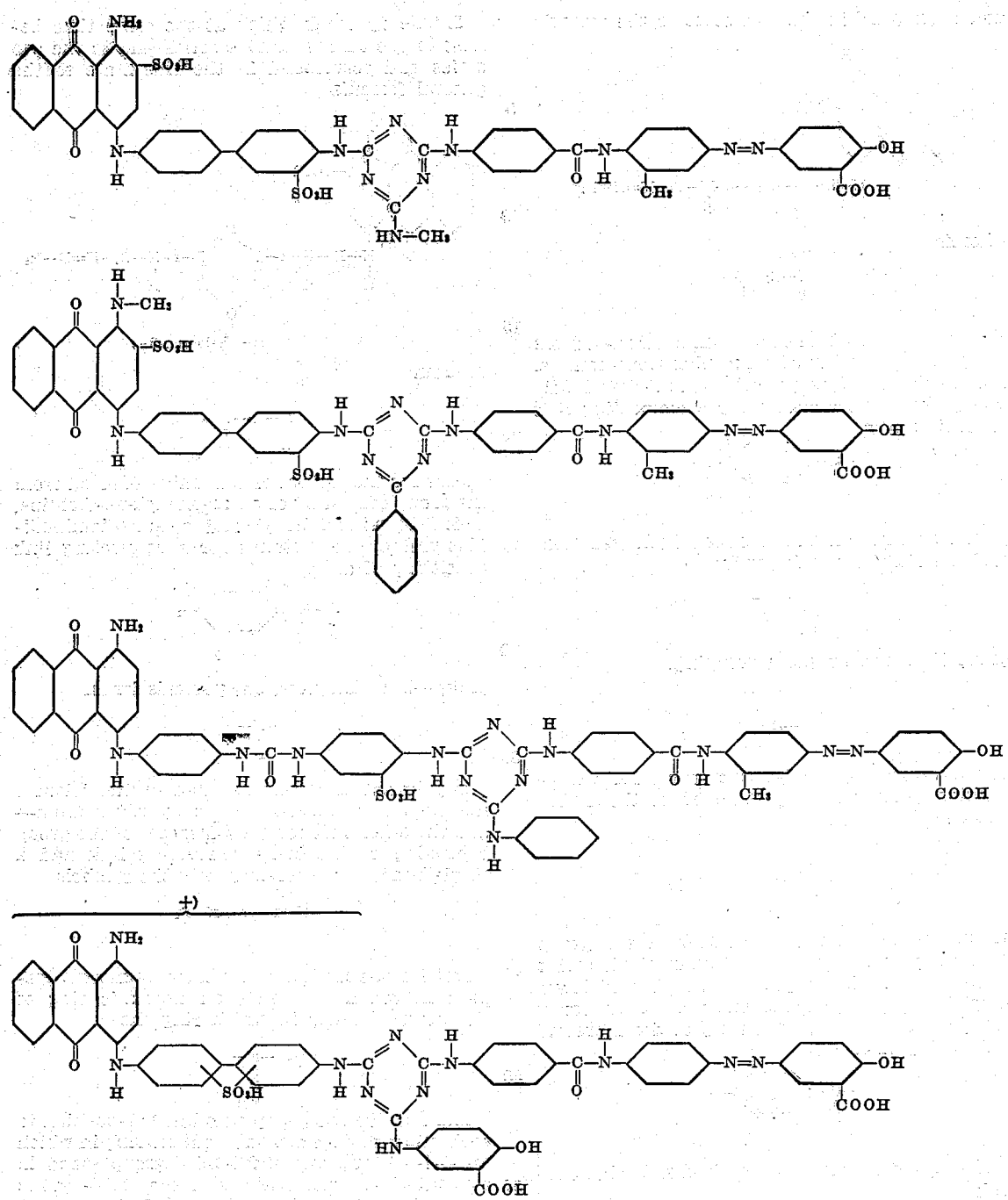

+) from the sulfonation product of:

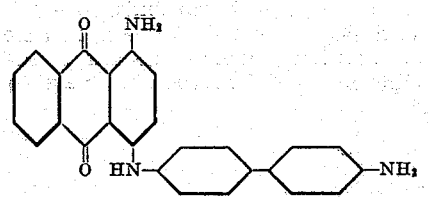

*Example 7*

100 parts of cotton are entered into a dyebath containing 3000 parts of water at 40–50° C., 1.5 parts of the dyestuff prepared according to the first paragraph of Example 1, and 2 parts of anhydrous sodium carbonate. The bath is then heated within ½ hour to 90–95° C. and 30 parts of crystallized sodium sulfate added, and the material is dyed at this temperature for ¾ hour. 2 parts of a solution of crystallized copper sulfate neutralized with caustic soda solution and 2.5 parts of tartaric acid in 100 parts of water are then added to the dyebath and the cotton is treated for ½ hour at about 95° C. in this bath. The material is then rinsed as usual and dried. It is dyed in fast, pure green tints.

The dyestuffs of the present application may also be used on union goods such as, for example, wool-viscose staple fiber mixture. In such cases dyeing is conducted advantageously in a neutral bath in the presence of sodium or potassium chromate.

What I claim is:

1. The dyestuffs which at the same time belong to the anthraquinone series and to the azo series and correspond in the free state to the formula $$\text{[anthraquinone structure with } NH_2, SO_3H, \text{ and } N-R_3-N-z-x-z-N-R_1-N=N-R_2 \text{ substituents, each N with H]}$$

wherein $$-\underset{H}{N}-R_3-\underset{H}{N}-$$

stands for the radical of a diamine selected from the group consisting of a 1:4-phenylenediamine, a 4:4'-diaminodiphenyl and a 4:4'-diaminodiphenylurea; one $z$ stands for a connecting link consisting of a $$-\underset{O}{\overset{\|}{C}}-\phantom{x}\text{cyclohexyl}-y-$$

group, wherein one $y$ stands for a hydrogen atom and the other $y$ stands for an $$-\underset{H}{N}-$$

group linked to an atom grouping $$-\underset{\diagdown}{\overset{N}{C}}$$

of the connecting member $x$; $x$ stands for a 1,3,5-triazine nucleus having attached to the 4-carbon atom an $$-\underset{t}{\overset{v}{N}}$$

grouping wherein $v$ is a member of the group consisting of hydrogen and lower alkyl, and $t$ is a member of the group consisting of lower alkyl and aryl; and the other $z$ stands for a member of the group consisting of the aforesaid connecting link $$-\underset{O}{\overset{\|}{C}}-\phantom{x}\text{cyclohexyl}-y-$$

and a single bond; and wherein finally the symbols $$-\underset{H}{N}-R_1-N=N-R_2$$

stand for the radical of a yellow aminoazo dyestuff in which $R_1$ represents an aromatic ring of the benzene series in which ring the $$-\underset{H}{N}-$$

group of the symbol $z$ and the azo group stand in para position to each other, and $R_2$ represents a benzene ring in which an OH group and a COOH group stand in o-position to each other and in which the OH— group stands in p-position to the —N=N— group, which dyestuffs yield green tints on vegetable fibers whose wet fastness may be enhanced by treatment with copper compounds.

2. The dyestuffs which at the same time belong to the anthraquinone series and to the azo series and correspond in the free state to the general formula $$\text{[anthraquinone with } NH_2, SO_3H, \text{ and } N-R_3-N-C\text{(triazine)}C-z-N-R_1-N=N-R_2\text{]}$$

$$H-N-\text{lower alkyl}$$

wherein $$-\underset{H}{N}-R_3-\underset{H}{N}-$$

stands for the radical of a diamine selected from the group consisting of a 1:4-phenylene-diamine, a 4:4'-diaminodiphenyl and a 4:4'-diaminodiphenylurea, one $z$ stands for a connecting link consisting of a $$-\underset{O}{\overset{\|}{C}}-\phantom{x}\text{cyclohexyl}-y-$$

group—in which group one $y$ stands for an $$-\underset{H}{N}-$$

group linked to a carbon atom of the triazine nucleus and the other $y$ for a hydrogen atom—and the other $z$ stands for a member of the group consisting of the same connecting link and a single bond, and wherein finally the symbols $$-\underset{H}{N}-R_1-N=N-R_2$$

stand for the radical of a yellow aminoazo dyestuff in which $R_1$ means an aromatic ring of the benzene series in which ring the $$-\underset{H}{N}-$$

group and the azo group stand in 1:4-position to each other, and $R_2$ means a benzene ring in which an OH— group and a COOH— group stand in o-position to each other, and the OH— group stands in para-position to the —N=N— group, which dyestuffs yield green tints on vegetable fiber whose wet fastness may be enhanced by treatment with copper compounds.

3. The dye-stuffs which at the same time belong to the anthraquinone series and to the azo series and correspond in the free state to the formula $$\text{[anthraquinone with } NH_2, SO_3H, \text{ and } N-R_3-N-z-C\text{(triazine)}C-z-N-R_1-N=N-R_2\text{]}$$

$$H-N-\text{lower alkyl}$$

wherein

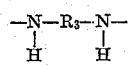

stands for the radical of a diamine selected from the group consisting of a 1:4-phenylene-diamine, a 4:4'-diaminodiphenyl and a 4:4'-diaminodiphenylurea, one z stands for a

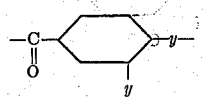

group—in which latter group one y stands for an

group linked to a carbon atom of the triazine nucleus and the other y stands for a hydrogen atom—, and the other z stands for a single bond, and wherein finally the symbols

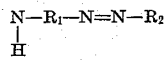

stand for the radical of a yellow aminoazo dyestuff in which R₁ means an aromatic ring of the benzene series in which ring the

group and the azo group stand in para position to each other, and R₂ means a benzene ring in which an OH— group and a COOH— group stand in o-position to each other and the OH— group stands in para position to the —N=N— group, which dyestuffs yield green tints on vegetable fiber whose wet fastness may be enhanced by treatment with copper compounds.

and correspond in the free state to the formula

wherein one z stands for a

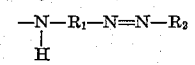

group—in which latter group one y stands for an

group linked to a carbon atom of the triazine nucleus and the other y stands for a hydrogen atom—, and the other z stands for a single bond, and wherein finally the symbols

—N—R₁—N=N—R₂
|
H stand for the radical of a yellow aminoazo dyestuff in which R₁ means an aromatic ring of the benzene series in which ring the

—N—
|
H group of the symbol z and the azo group stand in 1:4-position to each other, and R₂ means a benzene ring in which an OH— group and a COOH— group stand in o-position to each other and in which the OH— group stands in p-position to the —N=N— group, which dyestuffs yield green tints on vegetable fiber whose wet fastness may be enhanced by treatment with copper compounds.

5. The dyestuff corresponding in the free state to the formula

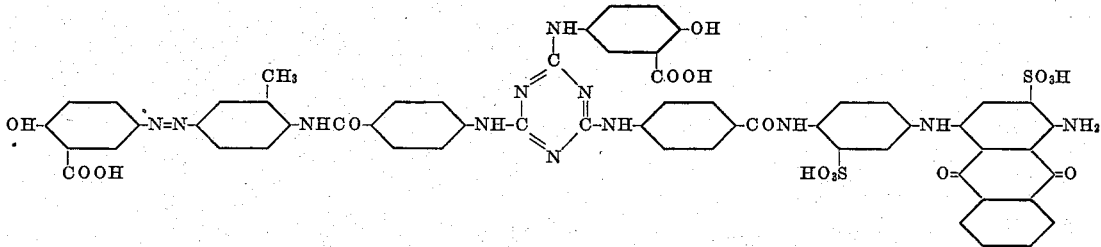

4. The dyestuffs which at the same time belong to the anthraquinone series and to the azo series 6. The dyestuff corresponding in the free state to the formula

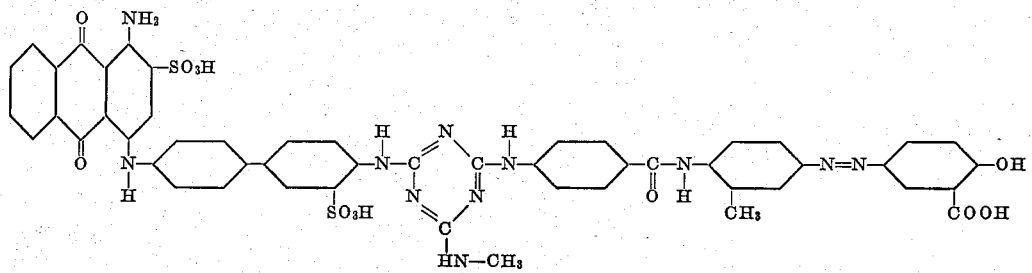

7. The dyestuff corresponding in the free state to the formula
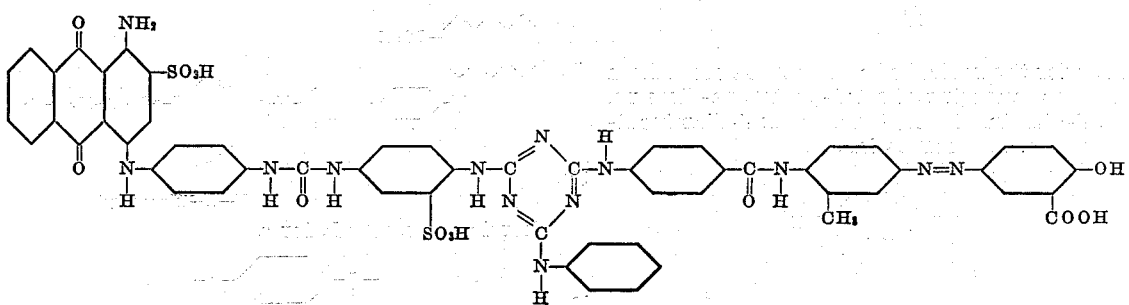
OTTO KAISER.